June 23, 1931. A. G. SOMMERBECK 1,811,656
METHOD OF REPAIRING PUNCTURED TIRES
Filed Feb. 6, 1928
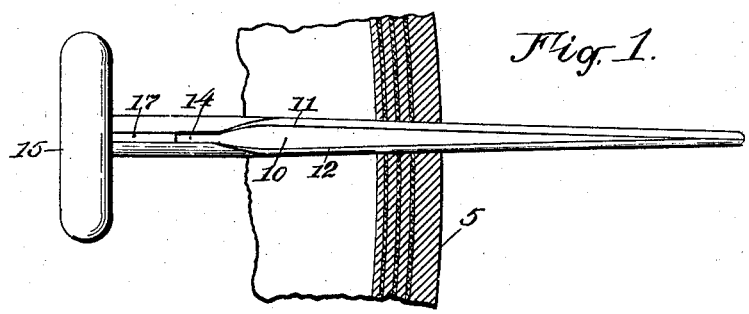
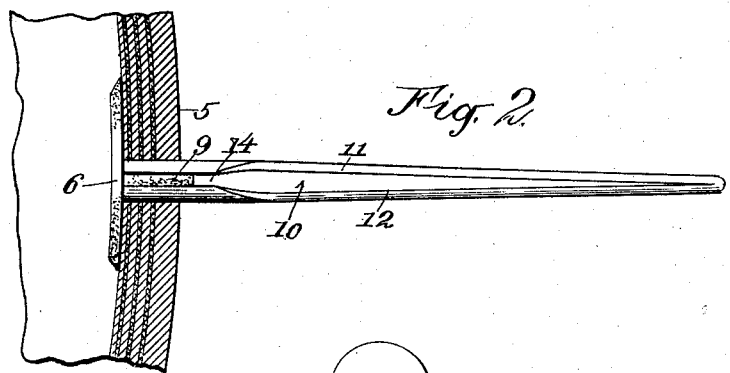
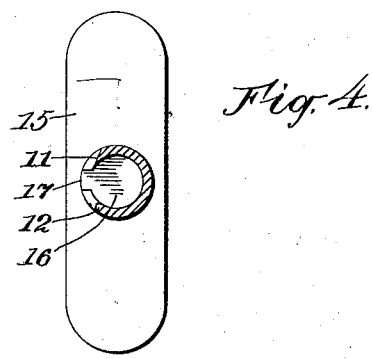
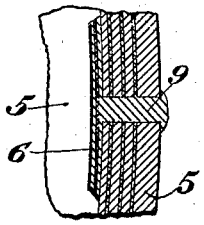
Inventor.
Adolph G. Sommerbeck
By Rippey & Stingsland
His Attorneys.

Patented June 23, 1931

1,811,656

UNITED STATES PATENT OFFICE

ADOLPH G. SOMMERBECK, OF CHICAGO, ILLINOIS, ASSIGNOR TO KEX COMPANY, INCORPORATED, OF ST. LOUIS, MISSOURI, A CORPORATION OF MISSOURI

METHOD OF REPAIRING PUNCTURED TIRES

Application filed February 6, 1928. Serial No. 252,151.

This invention relates to a method of repairing punctures in the casings of automobile tires, and an object of the invention is to provide a method whereby the work of making such repairs is greatly facilitated and expedited.

It is known that when and after a hole is formed in the casing of an automobile tire by puncture or otherwise, quantities of dirt and other substances enter and are retained in the hole. If the puncture hole or the like is permitted to remain unrepaired the air pressure by which the inner tube is inflated will eventually force the inner tube into the hole, thus expanding a portion of the inner tube beyond its intended extent of expansion and finally bursting the same. The dirt and other substances which work into the hole cause damage to the casing, as well as to the inner tube.

Another object of the invention is to provide a method whereby the deposits of dirt and other substances in puncture holes and the like may be removed and the damage to the tire repaired without any considerable trouble or expense, whether such repairs be made upon the highway or in shops or repair stations.

Other objects will appear from the following description, reference being made to the accompanying drawings, in which Fig. 1 is a view showing a portion of a tire casing in section and having the tool extending partly through the puncture hole in position for operation to remove the dirt and other substances from the puncture hole.

Fig. 2 is a similar sectional view showing the tire patch in connection with the tire, ready for final operations.

Fig. 3 is a similar sectional view showing the tire patch applied after all operations have been completed.

Fig. 4 is a cross sectional view of the repair tool.

The casing 5 having been punctured the dirt and other foreign deposits in the puncture hole are first removed, preparatory for application of the tire patch. The dirt and other deposits may be removed from the puncture hole by use of a tool constituting a patch applicator, and an embodiment of which is shown in the drawings. This tool comprises a hollow tapered stem 10 which is slotted as shown, and having a sharp edge 11 at one side of the slot and a rounded edge 12 at the other side of the slot (Fig. 4). An operating handle 15 may be detachably connected to the larger end of the tool and the tool thereby turned in one direction to cause the sharp edge 11 to remove all dirt and other deposits from within the puncture hole. The stem 16 of the handle 15 extends into the larger end of the tool and has a flange 17 engaging in the gap 14 so that the tool may be turned first in one direction to clean the hole and then in the other to apply cement to the wall of the hole.

After the dirt has been scraped and removed from the hole cement may be applied to the wall of the hole if desired by pouring cement into the tool and turning the tool in the opposite direction, causing the rounded edge 12 to spread the cement upon the wall of the hole.

After the hole has been prepared for application of the patch the tool is moved to position shown in Fig. 2, and the patch is applied. This patch comprises a sheet 6 of pliable material and a stem 9 of homogeneous rubber or the like.

The patch is applied by inserting the stem 9 into the larger end of the tool and pressing the patch to position in which the sheet 6 is in close contact with the inner periphery of the tire casing. Cement or other adhesive substance may be used to secure the sheet 6 to the casing. After the patch has been pressed to the position shown in Fig. 2, the tool is withdrawn outwardly and removed, leaving the end of the stem 9 protruding beyond the outer periphery of the tire. When the tool is removed the tire casing contracts upon and compresses the stem 9. Thereafter, the protruding end of the stem 9 is heated to soften the same sufficiently so that it may be spread against and on the adjacent peripheral surface of the tire, as will be readily understood by reference to Fig. 3.

Thus my improved process comprises the step of enlarging and cleaning the puncture hole and, if desired applying thereto a coating of cement or the like, after which the stem of the repair patch is passed through the enlarged cleaned and cement-coated puncture hole and is secured thereto by spreading the outer protruding end of the stem upon and against the peripheral surface of the tire.

The process also comprises, when desired, the step of adhesively uniting the patch sheet 6 with the inner periphery of the tire casing.

What I claim and desire to secure by Letters Patent is:—

1. The method of repairing a puncture in an automobile tire casing which comprises the steps of simultaneously expanding and cleaning the casing material around a puncture; then placing in the puncture, while the casing material remains expanded and cleaned, an elastic element; then causing the cleaned material of the automobile tire casing, around the puncture, to compress upon said element; and then heating and softening and spreading the outer end of said element upon and against the outer periphery of the tire casing around said puncture.

2. The method of repairing a puncture in an automobile tire casing which comprises the steps of simultaneously expanding and cleaning the casing material around the puncture; then applying an adhesive substance to the cleaned wall of the puncture; then placing in the puncture, while the casing material remains so expanded and cleaned and coated with said adhesive, an elastic element; then causing the material of the automobile tire casing, around the puncture, to compress upon said element; and then attaching the outer end of said element to the outer periphery of the tire casing.

3. A tool for repairing punctures in automobile tire casings comprising a tubular shank having a longitudinal slot throughout the length thereof and arranged to receive in one end the stem of a puncture filling plug, a tapered portion extending from one end of said shank and having a longitudinal slot of greater width than said slot in said shank and being in continuation of said slot in said shank, a member insertable in and withdrawable from said shank, and a flange in connection with said member arranged to engage in said slot in said shank and thereby turn said shank in either direction according to the direction of turning of said member.

ADOLPH G. SOMMERBECK.